United States Patent [19]

Niimura et al.

[11] Patent Number: 4,918,586
[45] Date of Patent: Apr. 17, 1990

[54] EXTENDED MEMORY DEVICE WITH INSTRUCTION READ FROM FIRST CONTROL STORE CONTAINING INFORMATION FOR ACCESSING SECOND CONTROL STORE

[75] Inventors: Akihiro Niimura, Toyonaka; Teiichi Lee, Osaka, both of Japan

[73] Assignee: Ricoh Company, Ltd., Tokyo, Japan

[21] Appl. No.: 892,088

[22] Filed: Jul. 30, 1986

[30] Foreign Application Priority Data

Jul. 31, 1985 [JP] Japan .............................. 60-170406
Sep. 20, 1985 [JP] Japan .............................. 60-209282

[51] Int. Cl.⁴ ...................... G06F 13/00; G06F 7/00; G06F 12/06
[52] U.S. Cl. .................................. 364/200; 364/243; 364/243.3; 364/262.4; 364/262.8; 364/264.1; 364/262.6; 364/246; 364/246.1
[58] Field of Search ... 364/200 MS File, 900 MS File

[56] References Cited

U.S. PATENT DOCUMENTS

| | | | |
|---|---|---|---|
| 4,095,265 | 6/1978 | Vrba | 364/200 |
| 4,124,891 | 11/1978 | Weller, III et al. | 364/200 |
| 4,164,786 | 8/1979 | Gollomp | 364/200 |
| 4,432,067 | 2/1984 | Nielsen | 364/900 |
| 4,481,570 | 11/1984 | Wiker | 364/200 |
| 4,484,261 | 11/1984 | Brantingham | 364/200 |
| 4,672,534 | 5/1987 | Kamiya | 364/200 |

FOREIGN PATENT DOCUMENTS 1437217 5/1976 United Kingdom ............... 364/200

*Primary Examiner*—Archie E. Williams, Jr.
*Assistant Examiner*—Emily Y. Chan
*Attorney, Agent, or Firm*—Cooper & Dunham

[57] ABSTRACT

A memory device provided on a one-chip microcomputer includes a high-speed ROM and a low-speed ROM which are arranged in the same address space and thus can be addressed by the same address pointer, wherein information requiring a high-speed operation and/or having a high access frequency is stored in the high-speed ROM and information requiring no high-speed operation and/or low access frequency is stored in the low-speed ROM. Another memory includes a pair of first and second memories, wherein the first memory includes an extended instruction for accessing the second memory, which thus serves as a virtual memory. The second memory is accessed only when reference is made to an address of an operand of an instruction which immediately follows the extended instruction.

3 Claims, 6 Drawing Sheets

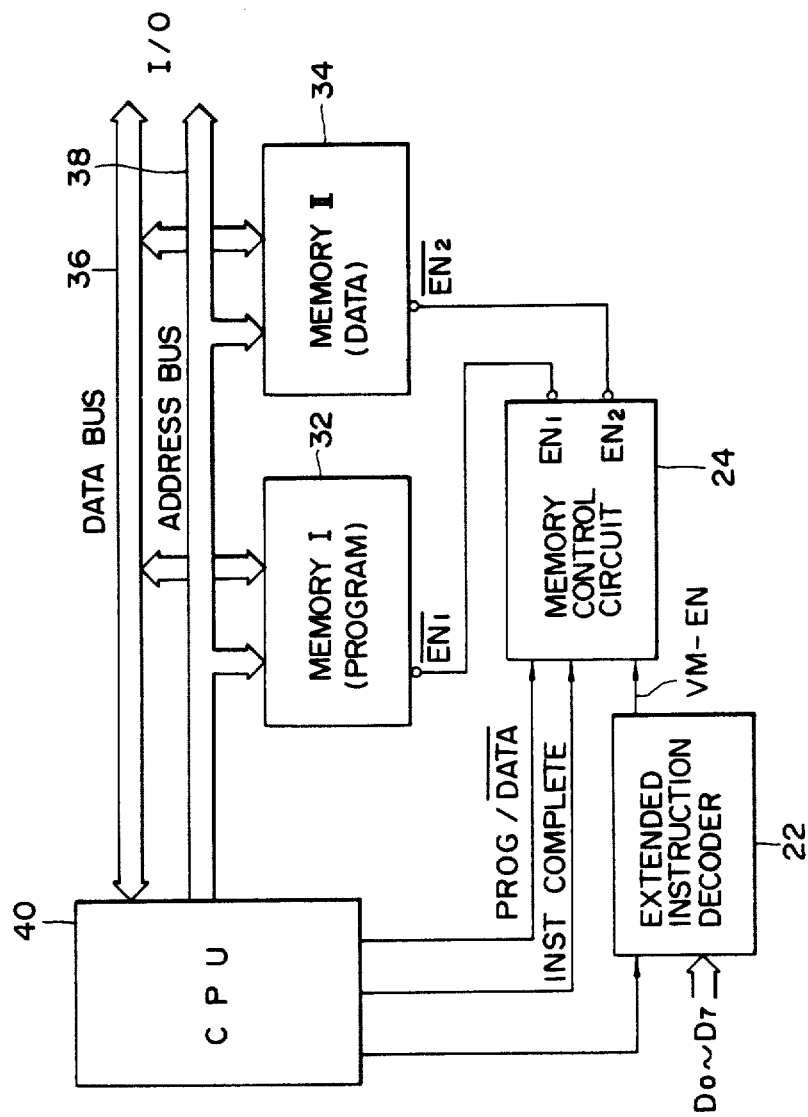

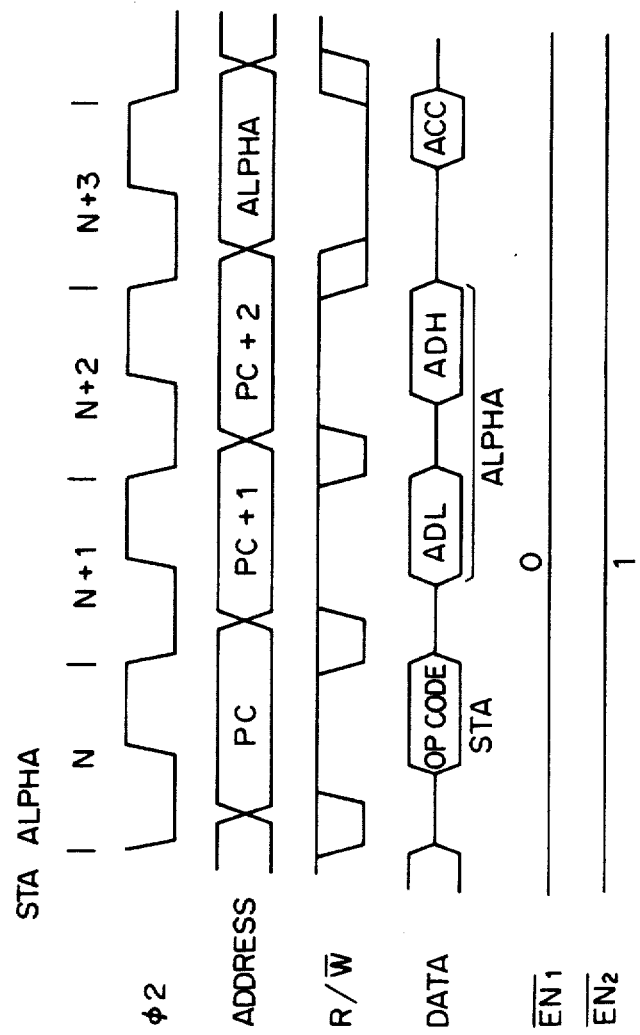

EXTENDED MEMORY DEVICE WITH INSTRUCTION READ FROM FIRST CONTROL STORE CONTAINING INFORMATION FOR ACCESSING SECOND CONTROL STORE

BACKGROUND OF THE INVENTION

1. Field of the Invention

This invention generally relates to a memory storage device for use in a computer system, and, in particular, to a memory device for use with a central processing unit (CPU) of a microcomputer system.

2. Description of the Prior Art

A read only memory (ROM) is well known and widely used as a memory device in a microcomputer system. The ROM is typically used to store a program and data and it may be classified into two types: (1), OR type high-speed ROM which is larger in size because of its low memory density but has a high read-out speed and (2) AND type low-speed ROM whose read-out speed is lower but whose memory density is higher, thereby allowing to obtain a large capacity while keeping compactness. Typically, given the same area, the AND type ROM can have the memory capacity twice to three times of that of the OR type ROM. However, since the read-out speed of the AND type ROM is significantly slower, the AND type ROM is not normally used by itself.

On the other hand, as shown in FIG. 1, in the case where use is made only of an OR type high-speed ROM as a ROM 4 in a one-chip microcomputer 2, as the capacity required for the ROM 4 increases, the percentage of area occupied by the ROM 4 increases significantly, so that the capacity of the ROM 4 begins to play a major role in determining the size of a chip. Under the circumstances, in an one-chip microcomputer having an integrated large capacity ROM, use is often made of an AND-OR type ROM which is a combination of the AND type and OR type ROMs. However, such an AND-OR type ROM poses difficulties when used in high-speed applications of a CPU.

SUMMARY OF THE INVENTION

In accordance with one aspect of the present invention, there is provided a semiconductor device which includes an address space containing therein a high-speed ROM and a low-speed ROM. The high-speed ROM has a relatively low memory capacity but has a relatively high read-out speed. On the other hand, the low-speed ROM has a relatively high memory capacity but has a relatively low read-out speed. Both of the high-speed and low-speed ROMs are accessed by the same address pointer. And, the high-speed ROM stores data requiring a high read-out speed; whereas, the low-speed ROM stores data requiring no high read-out speed.

In accordance with another aspect of the present invention, there is provided a virtual memory system, in which two or more memory spaces are allocated in an address space of a CPU. A program memory and a work area are provided in a first address space which is accessed under normal condition. And, second and subsequent address spaces are accessed only at the time of reference to an object operand when designated. With such a structure, the entire address space possessed by a CPU may be made available as a data memory.

It is therefore a primary object of the present invention to obviate the disadvantages of the prior art as described above and to provide an improved memory device for use in a computer system.

Another object of the present invention is to provide an improved semiconductor memory device suitable for incorporation into an one-chip microcomputer.

A further object of the present invention is to provide an improved memory device for use in a one-chip microcomputer, which has a read-out speed close to that of a high-speed ROM and a memory capacity substantially equal to that of a low-speed ROM.

A still further object of the present invention is to provide an improved virtual memory device suitable for use in a CPU system of a microcomputer.

A still further object of the present invention is to provide an improved memory device fast in operation and at the same time compact in size.

Other objects, advantages and novel features of the present invention will become apparent from the following detailed description of the invention when considered in conjunction with the accompanying drawings.

BRIEF DESCRIPTION OF THE DRAWINGS

FIG. 8 is a block diagram showing a virtual memory device constructed in accordance with one embodiment of the present invention; and FIGS. 9a and 9b are timing charts useful for understanding the operation of the structure shown in FIG. 8.

DESCRIPTION OF THE PREFERRED EMBODIMENTS

Figure 1:
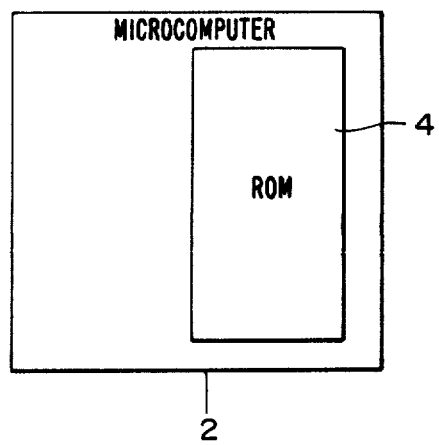
FIG. 1 is a schematic illustration showing the area occupied by a memory device in a prior art one-chip microcomputer.
Figure 2:
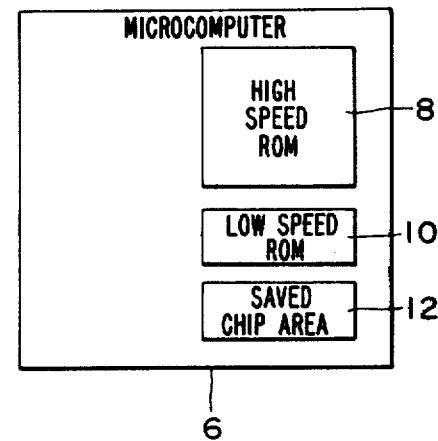
FIG. 2 is a schematic illustration showing the area occupied by a memory device including both high-speed and low-speed ROMs in a one-chip microcomputer constructed in accordance with one embodiment of the present invention.
Figure 3:
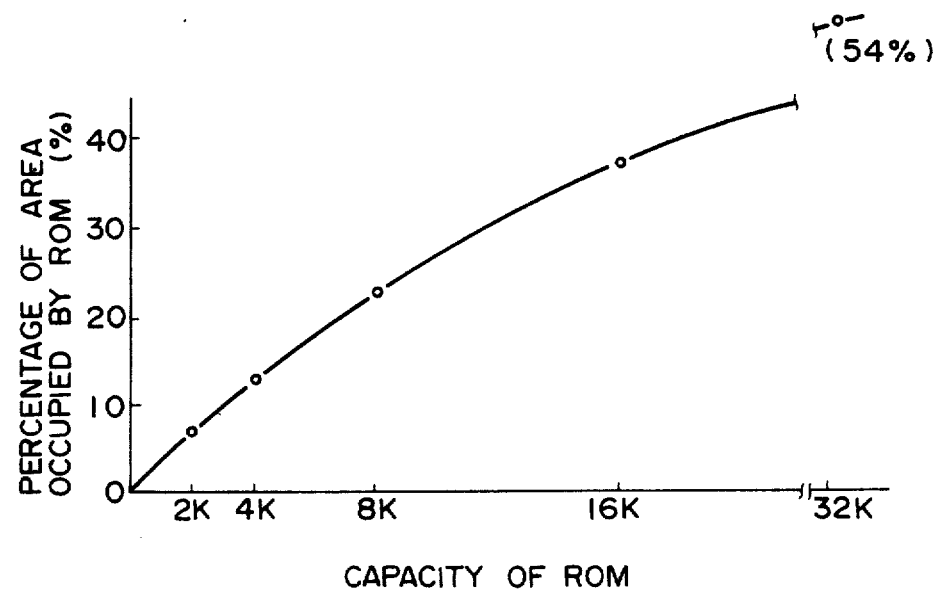
FIG. 3 is a graph showing a relation between the memory capacity and the area percentage occupied by ROM in the prior art structure shown in FIG. 1.

Referring now to FIG. 2, there is schematically shown a one-chip microcomputer 6 having incorporated therein a memory device constructed in accordance with one embodiment of the present invention. The memory device incorporated into the one-chip microcomputer 6 includes a high-speed ROM 8 and a low-speed ROM 10. It is to be noted that the combined memory capacity of ROMs 8 and 10 is set equal to the memory capacity of the ROM 4 in the prior art one-chip microcomputer 2. It should also be noted that the rectangles 8 and 10 only indicate the areas occupied by the respective ROMs in the one-chip microcomputer 6. It should also be noted that the high-speed ROM 8 and the low-speed ROM 10 define the same address space, and, thus, both of ROMs 8 and 10 are accessed by the same address pointer. A rectangle 12 indicates the chip area saved by providing the memory device of the present invention, including the high-speed and low-speed ROMs 8 and 10, in place of the conventional memory device 4.

The ROMs 8 and 10 include a program ROM storing a program to be executed by a CPU and a data ROM storing data to be utilized by the CPU. Examples of such a data ROM include data of a dot-matrix type character generator, display messages and tables. The program ROM is accessed very often, and, thus, it is required to have a high-speed characteristic, in particular high-speed read out characteristic; whereas, the data ROM is less often accessed as compared with the program ROM so that it is not required to have a high-speed characteristic, and, instead, it is required to have a significantly large memory capacity without requiring a large area. Under the condition, in the preferred embodiment of the present invention, a program, which is accessed very often by a CPU and thus requires a high-speed operation, is stored in the high-speed ROM 8; on the other hand, data, which does not require a high-speed operation but requires a significantly large memory capacity, is stored in the low-speed ROM 10.

There may be case where both of ROMs 8 and 10 are used as program ROMs for storing therein programs. In this case, those routines in a program, which are often accessed and/or require a high-speed operation, are stored in the high-speed ROM 8, and the rest of the program, which has less frequency of access and does not require a high-speed operation, is stored in the low-speed ROM 10.

As described above, in accordance with this aspect of the present invention, a memory device in a one-chip computer is provided with a high-speed ROM and a low-speed ROM. Thus, the present memory device occupies less chip area as compared with the case in which the memory device is comprised only of a high-speed ROM. In addition, since the present memory device has two ROM sections different in speed, programs and/or data may be appropriately allocated to the respective ROM sections depending on the degree of frequency of access and requirement for high-speed operation, thereby providing large memory capacity while keeping high performance.

Now, another aspect of the present invention for providing an improved virtual memory device suitable for use in a CPU system of a microcomputer will be described below.

For example, for image information to be displayed on the screen of a CRT, there must be provided a memory device having the capacity of 256×256 bytes=64 K bytes. An 8-bit CPU is provided with an addressing function of 64 K bytes. However, since the space for a program memory and a work area is required for the address space, the address space of 64 K bytes cannot be made available for a data memory in its entirety. The following two schemes are often used for allocating a memory to a CPU beyond its address space.

Figure 4:
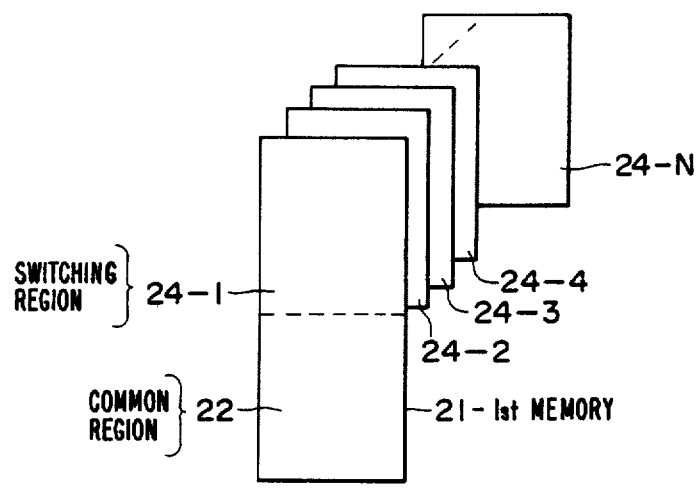
FIGS. 4 and 5 are schematic illustrations showing examples of the prior art virtual memory device.

(1) As shown in FIG. 4, a first memory 21 is divided into a common region 22 and a switching region 24-1 which can be switched with one of segments 24-2 through 24-N of other memories.

Figure 5:
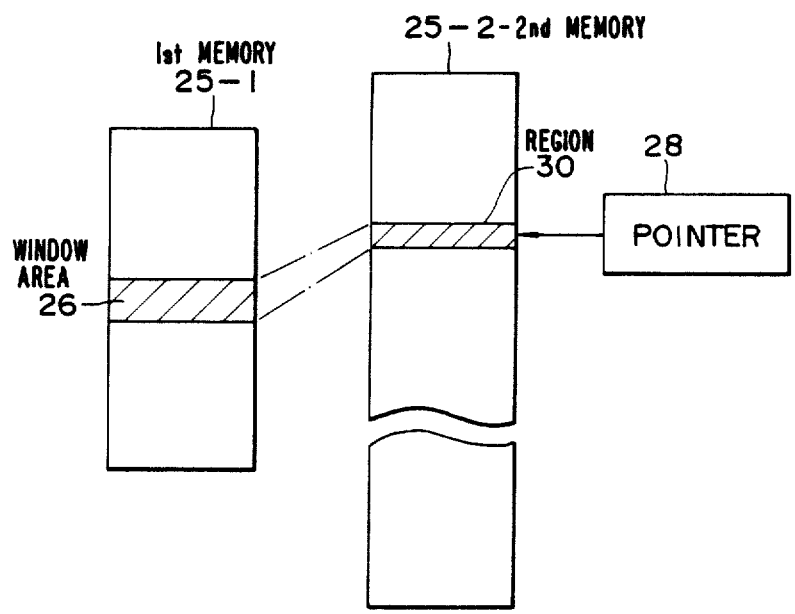

(2) As shown in FIG. 5, a first memory 25-1 is provided with a window area 26, through which a region 30 of another memory 25-2 is accessed by a pointer 28.

However, in accordance with either of these schemes, only a portion of the address space is projected, and the entire address space cannot be handled linearly. For this reason, the addressing function possessed by a CPU cannot be used effectively.

Figure 6A:
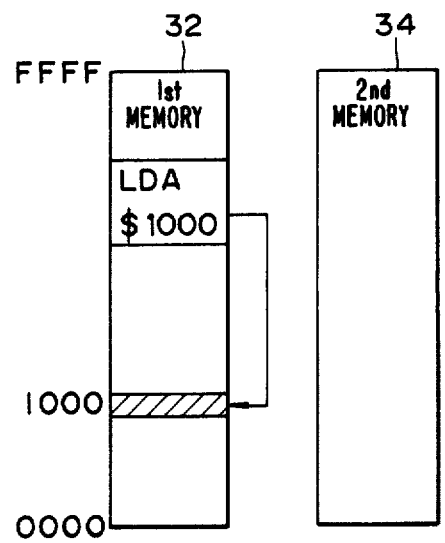
FIGS. 6a, 6b and 7 are schematic illustrations showing the principle of the present virtual memory device.
Figure 6B:
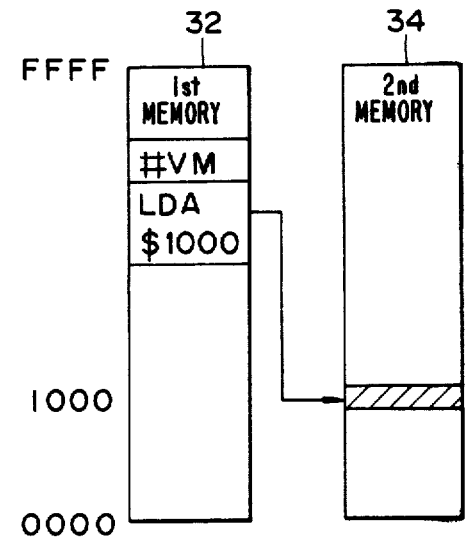

In contrast, the present invention provides a virtual memory device capable of making the entire address space of a CPU available to a data memory. FIGS. 6a and 6b show the case in which the present invention is applied to a direct addressing system. As shown, the present virtual memory device includes a first memory 32, which contains a program memory and a work area, and a second memory 34 which stores data only and contains neither program memory nor work area. In the case of a normal command, such as "LDA $1000", the operand at address 1000 in the first memory 32 is taken as indicated in FIG. 6a. On the other hand, in the case of an extended command for designating a virtual memory access, such as "#VM", as shown in FIG. 6b, the operand at address 1000 in the second memory 34 is taken in.

Figure 7:
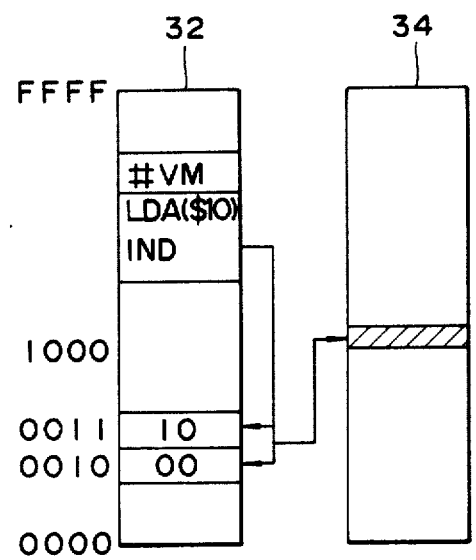

FIG. 7 schematically shows an example in which the second memory 34 is accessed according to the indirect accessing method in accordance with one embodiment of the present invention. The access procedure in this case includes the following cycles.

(1) Operation Code
(2) Operand Fetch
(3) Internal Cycle
(4) Lower Address Data Take-in (0010)
(5) Upper Address Data Take-in (0011)
(6) Object Operand Take-in (1000)
(7) Next Program Memory and Work Area Code It is only the cycle (6) that requires access to the second memory 34 at address 1000.

FIG. 8 shows in block form a virtual memory device constructed in accordance with one embodiment of the present invention. As shown, the illustrated memory device includes a pair of first and second memories 32 and 34, respectively. It is assumed here that the first memory 32 stores a program and the second memory 34 stores data. Both of the first and second memories 32 and 34 are connected to a CPU 40 via a data bus 36 and an address bus 38, which are also connected to an I/O device. Also provided in the present memory device is an extended instruction decoder which decodes the operation code of an extended instruction and outputs an extended instruction signal VM-EN. Also provided in the present memory device is a memory control circuit 24 which selects either one of the first and second memories 32 and 34. The memory control circuit 24 receives a status signal PROG/$\overline{\text{DATA}}$, which indicates whether the current reference to memory is program access or data access, another status signal INST COMPLETE, which indicates the completion of instruction, and an extended instruction signal VM-EN which is supplied from the extended instruction decoder 22. During a time period from the completion of instruction to the start of the next instruction, the memory control circuit 24 sets an enable signal $\overline{\text{EN}_1}$ for the first memory 32 to be high or "1" and an enable signal $\overline{\text{EN}_2}$ the second memory 34 to be low or "0."

Figure 9B:
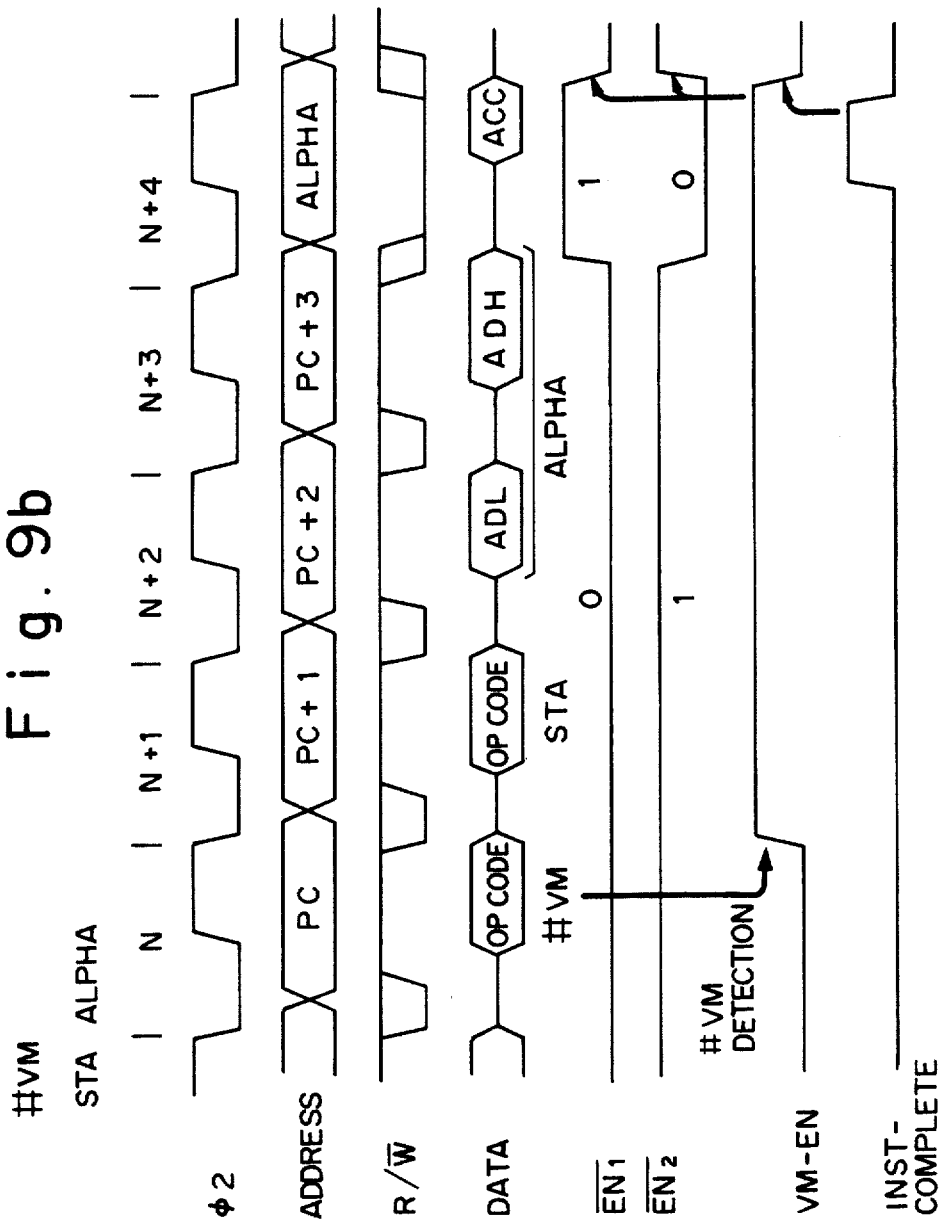

Now, it will be described with reference to FIGS. 9a and 9b of the case in which the data in an accumulator of the CPU 40 is stored into an address ALPHA of the memory device according to the direct addressing method. FIG. 9a is the case having no extended instruction. As shown in FIG. 9a, $\phi 2$ is a clock signal, and the enable signal $\overline{\text{EN}_1}$ is "0" and the enable signal $\overline{\text{EN}_2}$ is "1." In accordance with the addresses held in a program counter, an operation code indicating STA and a lower address ADL and an upper address ADH of an object address ALPHA are read out as instructions from the first memory 32. At the next clock, the address ALPHA is retained in a program counter, and a read/write signal R/W̄ is changed to "0" so that the data in the accumulator is written into the address ALPHA of the first memory 32.

FIG. 9b is the case having an extended instruction. In this case, the enable signal $\overline{EN_1}$ for the first memory 32 is set to be "0" and the enable signal $\overline{EN_2}$ is set to be "1." When an extended instruction "#VM", which designates accessing of the virtual memory, is read from the first memory 32, the extended instruction signal VM-EN is output from the extended instruction decoder 22 and stored into the memory control circuit 24. And, upon reading of an operation code indicating STA and a lower address ADL and an upper address ADH of an object address ALPHA from the first memory 32, the enable signal $\overline{EN_1}$ changed to "1", and the other enable signal $\overline{EN_2}$ is changed to "0", so that the data in the accumulator is written into the address ALPHA of the second memory 34. Thereafter, the status signal INST COMPLETE is supplied from the CPU 40 to the memory control circuit 24 to deactivate the extended instruction signal VM-EN, so that the enable signals $\overline{EN_1}$ and $\overline{EN_2}$ are returned to "0" and "1", respectively.

As described above, in accordance with this aspect of the present invention a data memory is allocated superposingly on an address space and under normal condition only the address space of the first data memory is accessed and the address space of one or more of the remaining data memories is accessed only at the time of reference to the address of an object operand of an instruction immediately after when designated specifically. As a result, for example, in the case of an 8-bit CPU, the following advantages can be specifically obtained.

(1) The data region of 64 K bytes can be used linearly.
(2) A complicated addressing operation, such as indirect addressing, can be used for the continuous data of 64 K bytes.
(3) The size of program and work regions can be set irrespective of the size of a data memory.

In this manner, since the data region which a CPU can access continuously and linearly, has been broadened, the processing of a large quantity of continuous data, such as image data, can be carried out efficiently.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A memory device for use in a CPU system, comprising:
   a first addressable memory coupled to and directly accessible by a CPU;
   a second addressable memory coupled to said CPU;
   said first memory including at least a first instruction which specifies an access to said second memory and is immediately followed in said first memory by a second instruction which contains an operation code specifying an operation to be performed with respect to one or more addresses in said second memory and contains an address code identifying said one or more addresses in said second memory; and
   selecting means for selecting one of said first and second memories in response to information supplied from said CPU, wherein said selecting means normally selects said first memory and, when said CPU reads said first instruction from said first memory, said selecting means selects said second memory temporarily only when said CPU accesses said one or more addressed in said second memory designated by said address code of said second instruction in said first memory;
   wherein said selecting means includes a memory control circuit coupled to said CPU and having a first output terminal for supplying a first enable signal to said first memory and a second output terminal for supplying a second enable signal to said second memory, and a first instruction decoder coupled between said CPU and said memory control circuit to receive said first instruction from said CPU and to decode said first instruction and to supply an output to said memory control circuit.

2. The device of claim 1 wherein said first memory stores a program and said second memory stores data.

3. The device of claim 1 wherein said first and second enable signals are opposite in state and their states are normally set to select said first memory and are reversed to select said second memory.

* * * * *